United States Patent [19]

Rannenberg

[11] Patent Number: 4,553,407
[45] Date of Patent: Nov. 19, 1985

[54] HIGH EFFICIENCY AIR CYCLE AIR CONDITIONING SYSTEM

[75] Inventor: George C. Rannenberg, Canton, Conn.

[73] Assignee: United Technologies Corporation, Hartford, Conn.

[21] Appl. No.: 560,612

[22] Filed: Dec. 12, 1983

[51] Int. Cl.[4] ............................................. F25D 9/00
[52] U.S. Cl. ........................................ 62/402; 62/434
[58] Field of Search .......................... 62/86, 402, 434; 60/39.07, 39.33

[56] References Cited

U.S. PATENT DOCUMENTS

| | | | |
|---|---|---|---|
| 2,772,621 | 12/1956 | Arnoldi | 60/39.07 |
| 2,966,047 | 12/1960 | De Paravicini | 62/335 |
| 3,277,658 | 10/1966 | Leonard, Jr. | 62/87 |
| 3,355,903 | 12/1967 | La Fleur | 62/88 |
| 3,367,125 | 2/1968 | McGrath | 62/116 |
| 3,494,145 | 2/1970 | Davis et al. | 62/402 |
| 3,868,827 | 3/1975 | Linhardt et al. | 62/63 |
| 4,127,011 | 11/1978 | Giles et al. | 62/402 |
| 4,263,786 | 4/1981 | Eng | 62/402 |
| 4,430,867 | 2/1984 | Warner | 62/402 |
| 4,434,624 | 3/1984 | Cronin | 62/434 |

*Primary Examiner*—Ronald C. Capossela
*Attorney, Agent, or Firm*—John Swiatocha

[57] ABSTRACT

An air cycle air conditioning system (10) is provided with regenerative heat exchangers (80, 110) upstream and downstream of an expansion turbine (90). A closed-loop liquid circulatory system serially connects the two regenerative heat exchangers for regeneration without the bulk associated with air-to-air heat exchange. The liquid circulatory system may also provide heat transport to a remote sink heat exchanger (150) and from a remote load (20) as well as heat exchange within the sink heat exchanger and load for enhanced compactness and efficiency.

7 Claims, 3 Drawing Figures

HIGH EFFICIENCY AIR CYCLE AIR CONDITIONING SYSTEM

DESCRIPTION

1. Technical Field

This invention relates generally to air cycle air conditioning systems and, more particularly, to a compact, highly efficient closed-loop air cycle air conditioning system remotely located from the system's heat load.

2. Background Art

Air cycle air conditioning systems are well known and quite popular for cooling and pressurizing compartments such as passenger cabins in commercial and military aircraft. Recently such air conditioning systems have been studied for potential use in the crew and equipment compartments of such land vehicles as tanks and other military vehicles powered by gas turbine or other types of engines. One reason for the popularity of such systems is the substantial amount of cooling available from air cycle systems of relatively modest size. Another reason for the popularity of such systems is the adaptability thereof to gas turbine engine powered vehicles, the compressor discharge section of the gas turbine engine providing a convenient source of pressurized refrigerant air for the air conditioning system.

Typically, state of the art air cycle air conditioning systems utilize a compressor which receives pressurized air from a source thereof, further compresses the air and discharges the air to a heat exchanger where the air gives up a portion of the heat of compression. From this heat exchanger, the compressed air is ducted to an expansion turbine wherein work done by the air in moving the turbine rotor causes a rapid expansion and cooling of the air, the cooled air then being discharged to a load such as an aircraft cabin. The turbine is connected to the compressor in a bootstrap arrangement whereby rotation of the turbine rotor by the expanding air provides input power to the compressor.

For the most part, such air cycle air conditioning systems have been open-loop systems. That is, subsequent to cooling the load, the refrigerant air is exhausted overboard, only a minute portion thereof in some cases being recirculated to the turbine exhaust for melting ice therein in the manner set forth in U.S. Pat. No. 4,374,469 to Rannenberg.

While open-loop, air cycle air conditioning systems have proven effective in certain applications, the requirement of such systems that refrigerant be continually resupplied from the ambient render such systems generally unsuitable for use in a contaminated environment. Closed-loop air cycle systems on the other hand are capable of providing cooling with a sealed, recirculating quantity of refrigerant air, have the potential for being more efficient than open-loop systems and are more suitable for use in a contaminated environment such as in the case of chemical warfare. Such closed-loop systems generally require the above-noted rejection of heat to ambient by a sink heat exchanger at the discharge of the system compressor and, when adapted for operation in a contaminated environment, may require the location of the sink heat exchanger at a location remote from the system's turbo-compressor unit. Such a remote disposition of the sink heat exchanger would require long runs of air conduit between the compressor and sink heat exchanger thereby adding substantially to the total volume occupied by the system as well as causing high pressure drop flow losses associated with the airflow through such conduit runs. Moreover, such systems may benefit from the utilization of regenerative air-to-air heat exchange between load discharge refrigerant and turbine inlet refrigerant which, where the system is provided for the cooling of a remote load, further contributes to long runs of air conduit and therefore further contributes to system bulk and inefficiency. Depending upon the application, such bulk and inefficiencies may be intolerable.

DISCLOSURE OF INVENTION

It is therefore a principal object of the present invention to provide an air cycle air conditioning system characterized by enhanced compactness and efficiency.

It is another object of the present invention to provide such an air conditioning system characterized by minimal runs of air conduit and minimal air-to-air heat exchange.

In accordance with one aspect of the present invention, enhanced compactness and efficiency in an air cycle air conditioning system is achieved by utilizing regenerative heat exchange between refrigerant air both upstream and downstream of the expansion turbine and a liquid heat transport fluid circulating to and from a remote heat load in a closed-loop liquid circulatory system whereby for enhanced efficiency, the refrigerant air is not required to function as a heat transport fluid. Heat transport is effected by the circulating liquid, conduits accommodating the flow thereof and defining the closed-loop air cycle system being of smaller flow area than air conduits for enhanced system compactness and efficiency.

In accordance with other aspects of the present invention, the system's sink heat exchanger which cools compressor discharge air by the rejection of heat therefrom to the ambient, may be remotely located from the air cycle portion of the air conditioning system and disposed in heat transfer relationship with the closed-loop liquid circulatory system whereby the liquid, in addition to providing regenerative precooling of turbine inlet air, also provides a means by which compressor discharge air is, with the load, cooled by the transport of heat away therefrom by means of a liquid rather than a gaseous medium for still further enhanced compactness and thermodynamic efficiency.

BEST MODE FOR CARRYING OUT THE INVENTION AND INDUSTRIAL APPLICABILITY THEREOF

Figure 1:
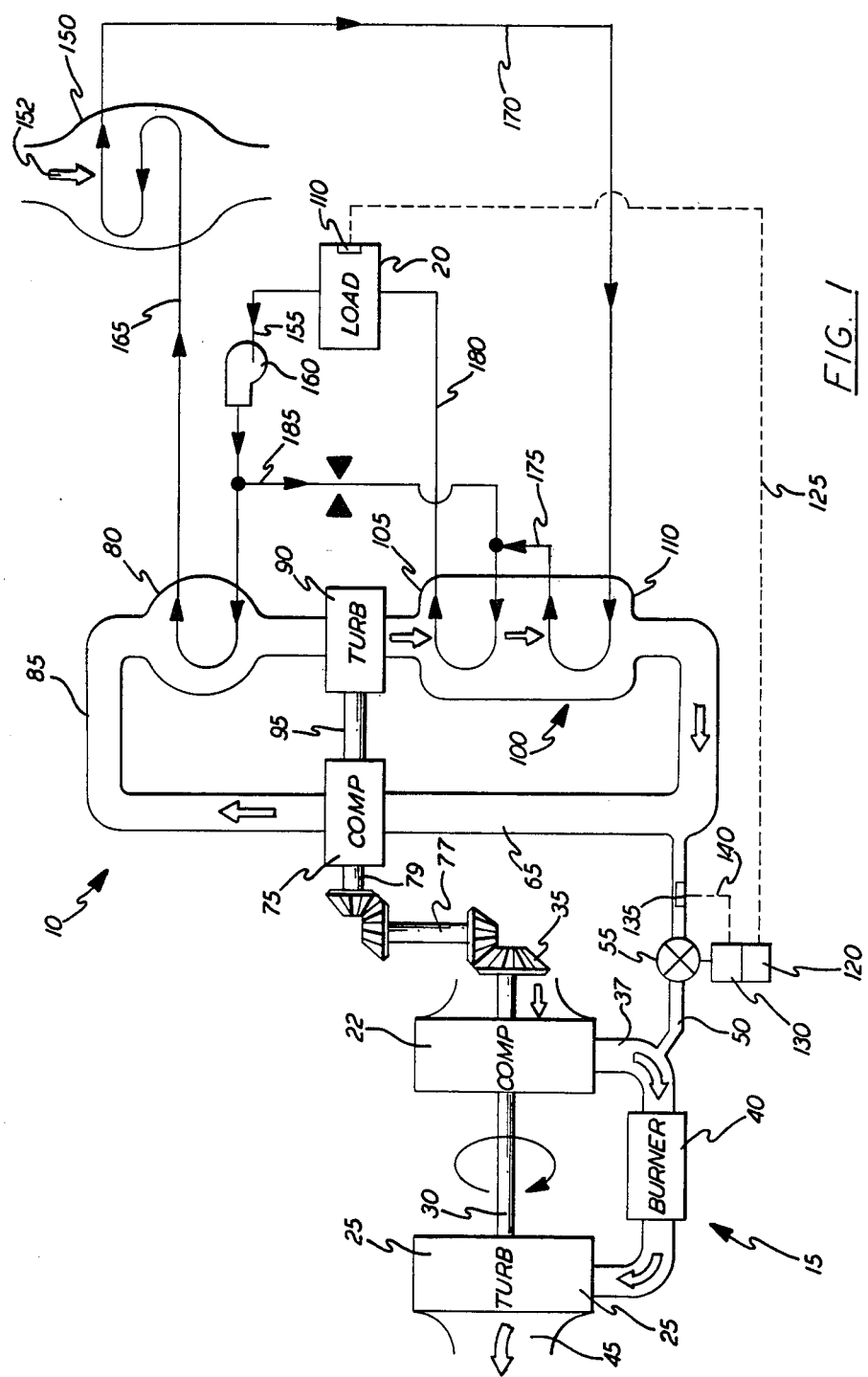
FIG. 1 is a schematic representation of a preferred embodiment of the air cycle air conditioning system of the present invention.

Referring to FIG. 1, the air cycle air conditioning system of the present invention indicated generally at 10 is both charged and driven by a gas turbine engine 15, and provides cooling of a load 20. In typical fashion, gas turbine engine 15 comprises a compressor 22 driven by a turbine 25 the rotors of the turbine and compressor being connected by shaft 30 having bevel gear 35 mounted thereon. As is well known in the art, air is drawn into the compressor, compressed to an elevated pressure, discharged from the compressor at discharge section 37 and mixed with fuel in burner 40 where the air-fuel mixture is burned. The products of combustion exhausted from burner 40 are ducted to turbine 25 thereby driving the turbine to both power the compressor and provide useful thrust through exhaust nozzle 45.

Air from the compressor discharge section 37 of gas turbine engine 15 charges air conditioning system 10 through line 50 having a control valve 55 therein. This system supply air is typically of a pressure in the range of 30 to 120 p.s.i. From duct 50, the charge air is fed to a closed-loop portion of system 10 through duct 65. The refrigerant air is fed by conduit 65 to compressor 75 which is driven by engine 15 off gear 35 and geared shafts 77 and 79. Compressor 75 compresses the refrigerant air for delivery to turbine inlet (high pressure) regenerative heat exchanger 80 through conduit 85. The air is delivered from regenerative heat exchanger 80 directly to expansion turbine 90, the rotor of which connects to the rotor of compressor 75 by shaft 95. In traversal of turbine 90, the compressed air applies a positive torque to the turbine rotor (and therefore to shaft 95) thereby performing work thereon and causing an expansion of the air whereby the air is chilled to attain a refrigerant air temperature drop of about 100° F. as the pressure thereof is lowered by a pressure ratio of about 3 to 1. The chilled and expanded air is exhausted from the turbine directly to a turbine exhaust (low pressure) heat exchanger 100 which includes a load section 105 and a regenerative section 110. From low pressure heat exchanger 100 the expanded refrigerant air is returned to compressor 75 through duct 65 for recompression therein.

Control valve 55 is operated in response to temperature sensor 110 disposed within load 20. This sensor provides signals indicative of the temperature of load 20 to controller/actuator 120 through line 125. Controller/actuator 130 receives a signal indicative of the pressure in line 50 from pressure sensor 135 through line 140. In both cases, controller/actuators 120 and 130 continually trim control valve 55 to maintain desired temperatures and pressures in response to the signals received from sensors 110 and 140, respectively, and input signals to the controller/actuators indicative of desired temperatures and pressures.

The input power provided the system by engine 15 and the cooling output of the system are controlled by valve 55. At steady state conditions, i.e., when the cooling provided by system 10 is equal to that required by the load, valve 55 is maintained in an essentially closed condition by controller/actuators 120 and 130, this valve opening only to overcome any leakage of refrigerant air from the system, and the various pressures and flow rates within the system remain constant as does the cooling output thereof. As the cooling demands of load 20 increase, the regulated refrigerant air pressure is raised, controller/actuators 120 and 130 opening control valve 55 in response to the output signal of sensor 110 thereby increasing the refrigerant pressure within system 10 to increase the capacity and therefore the output thereof. In the event that less cooling is required by the load, controller/actuator 120 will close down control valve 55 whereby normal leakage of air from the system will in time reduce refrigerant pressure within the system, thereby reducing refrigerant airflow and thus, cooling output of the system as well as the shaft power absorbed by the compressor 75 and the kinetic energy absorbed from the gas turbine engine compressor discharge air. This, of course, reduces the power expended by engine 15 in driving the system. System 10 is provided with a closed-loop liquid circulatory system serially connecting the high pressure regenerative heat exchanger 80 with remote sink heat exchanger 150, low pressure heat exchanger 100 and load 20. As illustrated in FIG. 1, the closed-loop liquid system comprises conduit 155 connecting load 20 with the inlet to high pressure regenerative heat exchanger 80 and a pump 160 disposed anywhere in the loop for pumping liquid coolant such as ethylene glycol or other suitable heat transport fluid through the loop system. Line 165 connects the discharge side of regenerative heat exchanger 80 with the inlet of sink heat exchanger 150 which discharges through line 170 to the inlet of regenerative section 110 of low pressure heat exchanger 100. Regenerative section 110 discharges through line 175 to the inlet of load section 105 of the low pressure heat exchanger, the load section discharging to load 20 through line 180. From load 20 the liquid coolant is drawn into pump 160 for repeated circulation around the loop thus defined.

In operation, as the liquid coolant circulates in the direction of the arrows, the coolant absorbs heat within high pressure regenerative heat exchanger 80, flows through conduit 165 and then rejects at least a portion of the heat so absorbed to coolant (in most cases ambient air) flowing through sink heat exchanger 150 in the direction of arrow 152. The liquid coolant then flows through line 170 to regenerative section 110 of low pressure heat exchanger 100 where the liquid coolant is chilled by cool air discharged from expansion turbine 90. The liquid coolant is chilled further within the load section 105 of low pressure heat exchanger 100 from which the coolant is ducted through load 20 where it absorbs heat therefrom, thereby providing the required cooling thereof. The liquid coolant is then recirculated through this loop by pump 160. The closed liquid circulatory loop is also provided with a branch conduit 185 connecting the inlet of the load section 105 with liquid coolant discharged from the load. Thus, it is seen that liquid coolant flow from pump 160 is split, a portion thereof being passed through high pressure regenerative heat exchanger 80 and the closed-loop circulatory system described above, and the remainder of the liquid coolant being channeled through branch conduit 185 (having orifice 190 therein) to the inlet of load section 185. This portion of the flow passes through the load section and is then discharged therefrom through line 180 to load 20 and returned to pump 160 through line 155. As those skilled in the art will appreciate, branch conduit 185 allows a portion of the liquid flow through closed-loop system to circulate between the load and the load section of the low pressure heat exchanger without circulation through the high pressure regenerative heat exchanger and the absorption of heat attendant therewith. This in effect, reserves a portion of the cooling capacity of the branch conduit flow solely for load cooling without any heating of the branch flow by the warm compressor discharge air in high pressure regenerative heat exchanger 80. It will be recognized that coolant flow through branch 185 is determined by the size of orifice 190. The orifice is sized in accordance with such factors as the characteristics of the airflow through the air cycle portion of air conditioning system 10, coolant flow through the load, and coolant flow through the high pressure regenerative heat exchanger. It has been determined that for maximum cooling:

$$\frac{w_{air} \, c_{p \, air}}{w_{regen. \, coolant} \, c_{p \, regen. \, coolant}} \approx 1.0$$

wherein:
$w_{air}$ and $c_{p \, air}$ are the mass flow rate and specific heat, respectively, of the airflow through the air cycle portion of the air conditioning system; and
$w_{regen. \, coolant}$ and $c_{p \, regen. \, coolant}$ are the mass flow rate and specific heat, respectively, of the liquid coolant circulating through the high pressure regenerative heat exchanger 80 and low pressure regenerative heat exchanger 110. It has also been determined that for minimum input power to drive system 10 the following relationship is observed:

$$\frac{w_{load \, coolant} \, c_{p \, load \, coolant}}{w_{regen. \, coolant} \, c_{p \, regen. \, coolant}} \approx 2.5$$

wherein:
$w_{load \, coolant}$ and $c_{p \, load \, coolant}$ are the mass flow rate and specific heat, respectively, of the liquid coolant circulating through the load; and
$w_{regen. \, coolant}$ and $c_{p \, regen. \, coolant}$ are the mass flow rate and specific heat, respectively, of the liquid coolant circulating through the high pressure regenerative heat exchanger.

From these two expressions, flow through branch conduit 185 for maximum cooling and minimum system input power may be calculated and thus, the size of orifice 190 may be easily determined.

Figure 2:
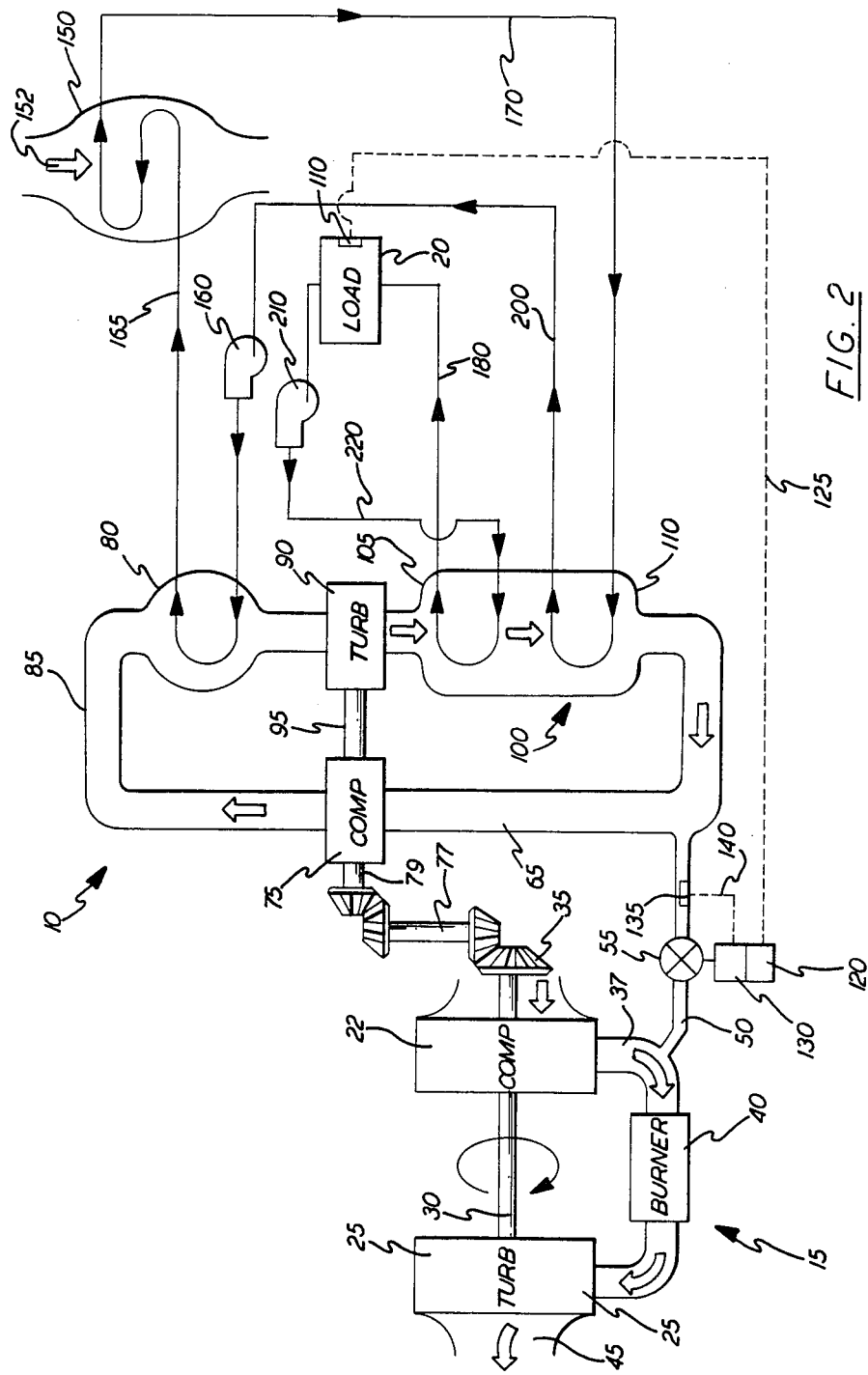
FIG. 2 is a schematic representation of a first alternate embodiment of the air cycle air conditioning system.

Referring to FIG. 2, a first alternate embodiment of the air conditioning system of the present invention is shown. In FIGS. 1 and 2, like reference numerals correspond to like components. As those skilled in the art will recognize, the only difference between the embodiments of FIGS. 1 and 2 is that in the embodiment of FIG. 1, a single liquid circulatory system is employed while in the first alternate embodiment, two separate and independent liquid circulatory systems are employed. In the alternate embodiment, as in the system of FIG. 1, pump 160 discharges to high pressure regenerative heat exchanger 80 which in turn discharges through conduit 165 to sink heat exchanger 150. From the sink heat exchanger, the liquid coolant is discharged to regenerative section 110 of low pressure heat exchanger 100 through line 170. However, rather than discharging to the load, regenerative section 110 discharges through conduit 200 back to pump 160 whereby the coolant in this outer loop transports heat absorbed within the high pressure regenerative heat exchanger to the sink and low pressure regenerative heat exchangers where that heat is rejected to ambient and chilled turbine discharge air, respectively, without any load cooling. Load cooling is provided solely by the second (inner) closed-loop liquid system wherein after cooling load 20, the liquid coolant is returned by a second pump 210, back to load section 105 through line 220 without the absorption of heat from the compressor discharge air in the regenerative heat exchanger. The magnitude of flows through the first and second closed loops may be determined from the above-noted relationships involving the flows and specific heats of air and liquid coolant flows through the system.

It will be seen that the systems illustrated in FIGS. 1 and 2 exhibit enhanced compactness due to the elimination therein of all air-to-air heat exchange, all heat exchange within the systems being accomplished by more compact air-to-liquid heat exchangers. Furthermore, where the load and sink heat exchanger are located remotely from the turbo-compressor (air cycle) portion of the system, use of a liquid rather than air as a heat transport fluid between the turbo-compressor and the load and sink heat exchangers not only reduces flow pressure drop losses for enhanced efficiency, but enhances compactness by replacing long runs of air conduit with liquid conduit of substantially lesser flow area.

Figure 3:
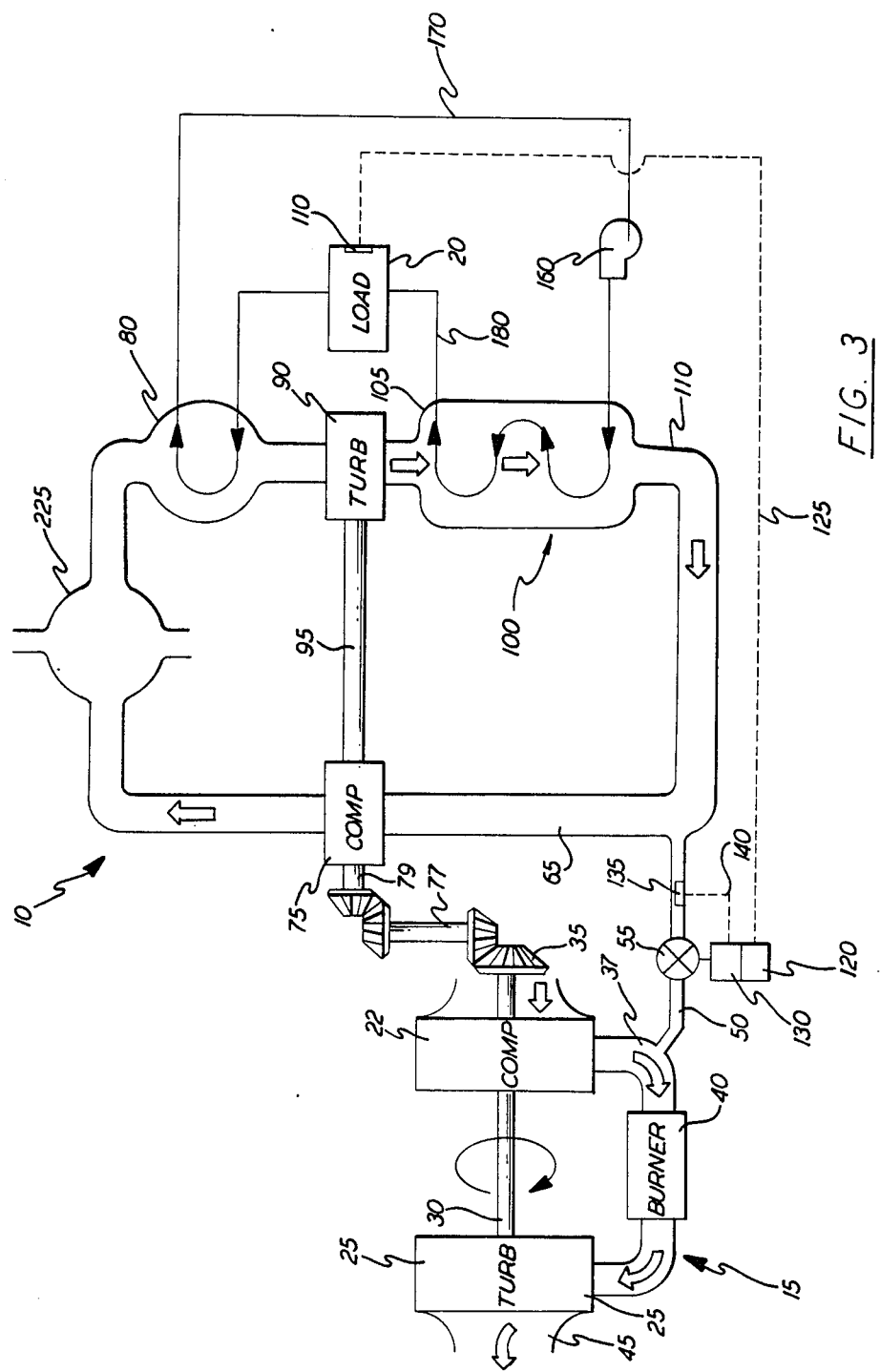
FIG. 3 is a schematic representation of a second alternate embodiment of the system.

Referring to FIG. 3, a second alternate embodiment of the air conditioning system of the present invention is illustrated. In FIG. 3, where absolute minimization of system size is not required and therefore air-to-air heat exchange (compressor discharge air being cooled by ambient air) in sink heat exchanger 225 allowable, the closed-loop circulatory system serially connects the load with the high pressure regenerative heat exchanger and the serially connected load and regenerative sections of the low pressure heat exchanger. With the exception of the air-to-air heat exchange in the sink heat exchanger, the operation of the embodiment shown in FIG. 3 is the same as the embodiments illustrated in FIGS. 1 and 2. Coolant circulates throughout the closed-loop absorbing heat from compressor discharge air in the high pressure regenerative heat exchanger, rejecting the heat in the load and regenerative sections of the low pressure heat exchanger after which the coolant is circulated through the load for the removal of heat therefrom. The embodiment of FIG. 3 is characterized by the advantages of high efficiency and compactness associated with a liquid heat transport system in the place of prior art air systems to remove heat from the load and provide regenerative heat exchange.

While these particular embodiments of the present invention have been shown, it will be understood that various modifications of the present invention will, from disclosure herein, suggest themselves to those skilled in the art. For example, while the systems shown are powered and charged with air by a gas turbine engine, it will be understood that alternate powering (electric motors) and charging schemes may be employed without departing from this invention and it is the intention of the following claims to cover such modifications as fall within the true spirit and scope of this invention.

Having thus described the invention, what is claimed is:

1. An air cycle air conditioning system, said system including a compressor for compressing air supplied thereto, said compressor discharging to an expansion turbine which expands and chills said compressed air for the cooling of a load, said system further including a high pressure regenerative heat exchanger by which said chilled air precools said compressed air prior to the expansion thereof within said turbine, said air conditioning system being characterized by:
 a low pressure heat exchanger, said expanded and chilled air being discharged through said low pressure heat exchanger from said expansion turbine; and
 a closed-loop liquid circulatory system, portions thereof being in heat exchanger relationship with said compressed air in said regenerative heat exchanger and said chilled air in said low pressure heat exchanger;

liquid circulating within said closed-loop circulatory system cooling air conditioning system airflow by absorbing heat therefrom within said regenerative heat exchanger and rejecting said heat to said chilled air within said low pressure heat exchanger.

2. The air cycle air conditioning system of claim 1 characterized by a portion of said closed-loop circulatory system being in heat transfer relationship with said load, said load being cooled by a flow therethrough of said liquid and further characterized by said low pressure heat exchanger including a load section and a regenerative section, liquid circulating through said load section rejecting therewithin, heat absorbed from said load by said flow of liquid therethrough and liquid circulating through said regenerative section rejecting therewithin heat absorbed from said compressed air within said regenerative heat exchanger.

3. The air cycle air conditioning system of claim 2 characterized by:
a branch conduit connecting said load section of said low pressure heat exchanger with said liquid discharged from said load thereby allowing a portion of said liquid flow through said closed-loop system to circulate between said load and said load section of said low pressure heat exchanger within said branch without circulation through said regenerative heat exchanger and the absorption of heat from said compressed air attendant therewith.

4. The air cycle air conditioning system of claim 1 characterized by:
a sink heat exchanger adapted for remote disposition with respect to said system compressor and expansion turbine, a portion of said closed-loop liquid circulatory system being in heat exchange relationship with ambient air within said sink heat exchanger, at least a portion of the heat absorbed from said air conditioning system air in said regenerative heat exchanger being rejected to ambient in said sink heat exchanger.

5. The air cycle air conditioning system of claim 1 characterized by:
a second closed-loop circulatory system independent of said first closed-loop system, a first portion of said second closed-loop system being in heat transfer relationship with said load and a second portion of said second closed-loop system being in heat transfer relationship with said chilled air in a load section of said low pressure heat exchanger, liquid circulating within said second closed-loop circulatory system cooling said load by absorption of heat therefrom within said load and rejection of said load heat to said chilled air within said load section of said low pressure heat exchanger.

6. The air cycle air conditioning system of claims 2 or 5 characterized by the relationship:

$$\frac{W_{air}\, c_{p\ air}}{W_{regen.\ coolant}\, c_{p\ regen.\ coolant}} \simeq 1.0$$

wherein:
$W_{air}$ is the mass flow rate of said air flowing through said air cycle air conditioning system;
$c_{p\ air}$ is the specific heat of said air flowing through said air cycle air conditioning system;
$W_{regen.\ coolant}$ is the mass flow rate of said liquid circulating through said regenerative heat exchanger; and
$c_{p\ regen.\ coolant}$ is the specific heat of said liquid circulating through said regenerative heat exchanger.

7. The air cycle air conditioning system of claims 2 or 5 characterized by:

$$\frac{W_{load\ coolant}\, c_{p\ load\ coolant}}{W_{regen.\ coolant}\, c_{p\ regen.\ coolant}} \simeq 2.5$$

wherein:
$W_{load\ coolant}$ is the mass flow rate of said liquid circulated through said load;
$c_{p\ load\ coolant}$ is the specific heat of said liquid circulated through said load;
$W_{regen.\ coolant}$ is the mass flow rate of said liquid circulated through said regenerative heat exchanger; and
$c_{p\ regen.\ coolant}$ is the specific heat of said liquid circulated through said regenerative heat exchanger.

* * * * *